US011862943B2

(12) United States Patent
Nakai et al.

(10) Patent No.: US 11,862,943 B2
(45) Date of Patent: Jan. 2, 2024

(54) SPARK PLUG

(71) Applicant: NGK SPARK PLUG CO., LTD, Nagoya (JP)

(72) Inventors: Eiichi Nakai, Nagoya (JP); Masahiro Nishida, Nagoya (JP); Shingo Kozuka, Nagoya (JP)

(73) Assignee: NGK SPARK PLUG CO., LTD., Nagoya (JP)

( * ) Notice: Subject to any disclaimer, the term of this patent is extended or adjusted under 35 U.S.C. 154(b) by 56 days.

(21) Appl. No.: 17/912,086

(22) PCT Filed: Sep. 10, 2020

(86) PCT No.: PCT/JP2020/034255
§ 371 (c)(1),
(2) Date: Sep. 16, 2022

(87) PCT Pub. No.: WO2021/205677
PCT Pub. Date: Oct. 14, 2021

(65) Prior Publication Data

US 2023/0155353 A1 May 18, 2023

(30) Foreign Application Priority Data

Apr. 6, 2020 (JP) ................................ 2020-068218

(51) Int. Cl.
*H01T 13/34* (2006.01)

(52) U.S. Cl.
CPC .................................... *H01T 13/34* (2013.01)

(58) Field of Classification Search
CPC ...................................................... H01T 13/34
(Continued)

(56) References Cited

U.S. PATENT DOCUMENTS

| | | | |
|---|---|---|---|
| 10,153,619 | B2 | 12/2018 | Uegaki et al. |
| 2018/0191138 | A1 | 7/2018 | Uegaki et al. |
| 2019/0214791 | A1 | 7/2019 | Kaji et al. |

FOREIGN PATENT DOCUMENTS

| | | | |
|---|---|---|---|
| JP | H02-165587 | A | 6/1990 |
| JP | H08-315954 | A | 11/1996 |

(Continued)

OTHER PUBLICATIONS

Examination Report issued in related India Patent Application No. 202217038932 dated Nov. 28, 2022.

(Continued)

*Primary Examiner* — Christopher M Raabe
(74) *Attorney, Agent, or Firm* — KUSNER & JAFFE

(57) ABSTRACT

Spark plug has center electrode having leg portion extending in an axis direction, brim portion located at rear end side with respect to the leg portion and protruding outwards in a radial direction with respect to the leg portion and connecting portion connecting the leg portion and the brim portion; insulator having penetration hole and supporting the center electrode; and seal member filling the penetration hole and fixing the brim portion and the insulator. The center electrode satisfies "(D1-D2)/D1≤0.06", where a maximum value of a radius of the brim portion is D1, and a minimum value of the radius of the brim portion is D2, also satisfies "L2/L1≤0.30", where a size of the center electrode along the axis direction is L1, and a size along the axis direction from boundary between the connecting portion and the leg portion to a center of gravity of the center electrode is L2.

2 Claims, 4 Drawing Sheets

(58) Field of Classification Search
USPC .......................................................... 313/142
See application file for complete search history.

(56) References Cited

FOREIGN PATENT DOCUMENTS

| | | | | | |
|---|---|---|---|---|---|
| JP | 2010-267425 | A | | 11/2010 | |
| JP | 2015122157 | A | * | 7/2015 | |
| JP | 2017-010739 | A | | 1/2017 | |
| JP | 2017-183105 | A | | 10/2017 | |
| JP | 2019175707 | A | * | 10/2019 | |
| WO | WO-2014049905 | A1 | * | 4/2014 | ............. H01T 13/34 |
| WO | WO-2017/186239 | A1 | | 11/2017 | |

OTHER PUBLICATIONS

International Search Report from corresponding International Patent Application No. PCT/JP2020/034255 dated Nov. 10, 2020 with English-language translation.
Written Opinion from corresponding International Patent Application No. PCT/JP2020/034255 dated Nov. 10, 2020.

* cited by examiner

SPARK PLUG

TECHNICAL FIELD

The present disclosure relates to a spark plug.

BACKGROUND ART

As a spark plug for ignition used for a gasoline engine, there is known a spark plug having an insulator in which a penetration hole is formed along an axis direction and a center electrode disposed in the penetration hole (e.g. Patent Document 1). In the spark plug disclosed in Patent Document 1, a step portion formed in the penetration hole of the insulator so that its diameter is reduced toward a top end side supports a brim portion formed at the center electrode so as to protrude outwards in a radial direction. This center electrode of the spark plug does not have, at a rear end side thereof with respect to the brim portion, a portion whose diameter is reduced more than the brim portion, and the brim portion is short in size in the axis direction.

CITATION LIST

Patent Document

Patent Document 1: Japanese Unexamined Patent Application Publication No. 2017-183105

SUMMARY OF THE INVENTION

Technical Problem

The inventors of the present application found that since a surface area, which contacts a seal member, of the center electrode not having, at the rear end side thereof with respect to the brim portion, the portion whose diameter is reduced more than the brim portion is small as compared with that of a structure having the portion whose diameter is reduced, there is a risk that looseness of the center electrode will occur due to vibrations of the engine etc.. Then, the looseness of the center electrode may cause degradation in performance of the spark plug. Therefore, a technique capable of suppressing the occurrence of the looseness of the center electrode has been required.

Solution to Problem

The present disclosure can be realized as the following embodiment.

(1) According to the embodiment of the present disclosure, a spark plug is provided. A spark plug comprises: a center electrode having a leg portion extending in an axis direction along an axis of the spark plug, a brim portion located at an axis direction rear end side with respect to the leg portion and formed so as to protrude outwards in a radial direction with respect to the leg portion and a connecting portion connecting the leg portion and the brim portion; an insulator having a penetration hole formed along the axis direction and supporting the center electrode in the penetration hole; and a seal member filling the penetration hole and fixing the brim portion and the insulator. The insulator has a large diameter portion located at an axis direction rear end side of the insulator; a small diameter portion located at an axis direction top end side with respect to the large diameter portion, a diameter of the penetration hole at the small diameter portion being smaller than a diameter of the penetration hole at the large diameter portion; and a step portion connecting the penetration hole at the large diameter portion and the penetration hole at the small diameter portion and supporting the connecting portion. The center electrode satisfies "(D1-D2)/D1≤0.06", where a maximum value of a radius of the brim portion on a cross section including the axis is D1, and a minimum value of the radius of the brim portion on the cross section is D2, and the center electrode also satisfies "L2/L1≤0.30", where a size of the center electrode along the axis direction on the cross section is L1, and a size along the axis direction from a boundary between the connecting portion and the leg portion to a center of gravity of the center electrode is L2.

According to the spark plug of this embodiment, since the size L1 of the center electrode along the axis direction on the cross section including the axis and the size L2 along the axis direction from a boundary between the connecting portion and the leg portion to the center of gravity of the center electrode satisfy "L2/L1≤0.30", in the center electrode having the brim portion whose maximum value D1 and minimum value D2 satisfy "(D1-D2)/D1≤0.06", it is possible to prevent a position of the center of gravity of the center electrode from being located at an excessively top end side. Therefore, the position of the center of gravity of the center electrode can be prevented from being excessively separated from a position of the seal member fixing the center electrode and the insulator. This can suppress excessive swing or vibration of the center electrode around the seal member caused by vibrations etc.. thereby suppressing an occurrence of looseness of the center electrode which is caused by deformation of the seal member due to the swing or vibration of the brim portion.

(2) In the spark plug of the above embodiment, the sizes L1 and L2 of the center electrode could satisfy "L2/L1≤0.25".

According to the spark plug of this embodiment, since the sizes L1 and L2 of the center electrode satisfy "L2/L1≤0.25", the position of the center of gravity of the center electrode can be brought closer to positions of the connecting portion and the seal member. Therefore, the occurrence of the looseness of the center electrode can be further suppressed.

The present invention can be realized with various embodiments. For instance, the present invention can be realized in a manufacturing method of the spark plug and an embodiment of an engine head to which the spark plug is connected, and so on.

EMBODIMENTS FOR CARRYING OUT THE INVENTION

Figure 1:
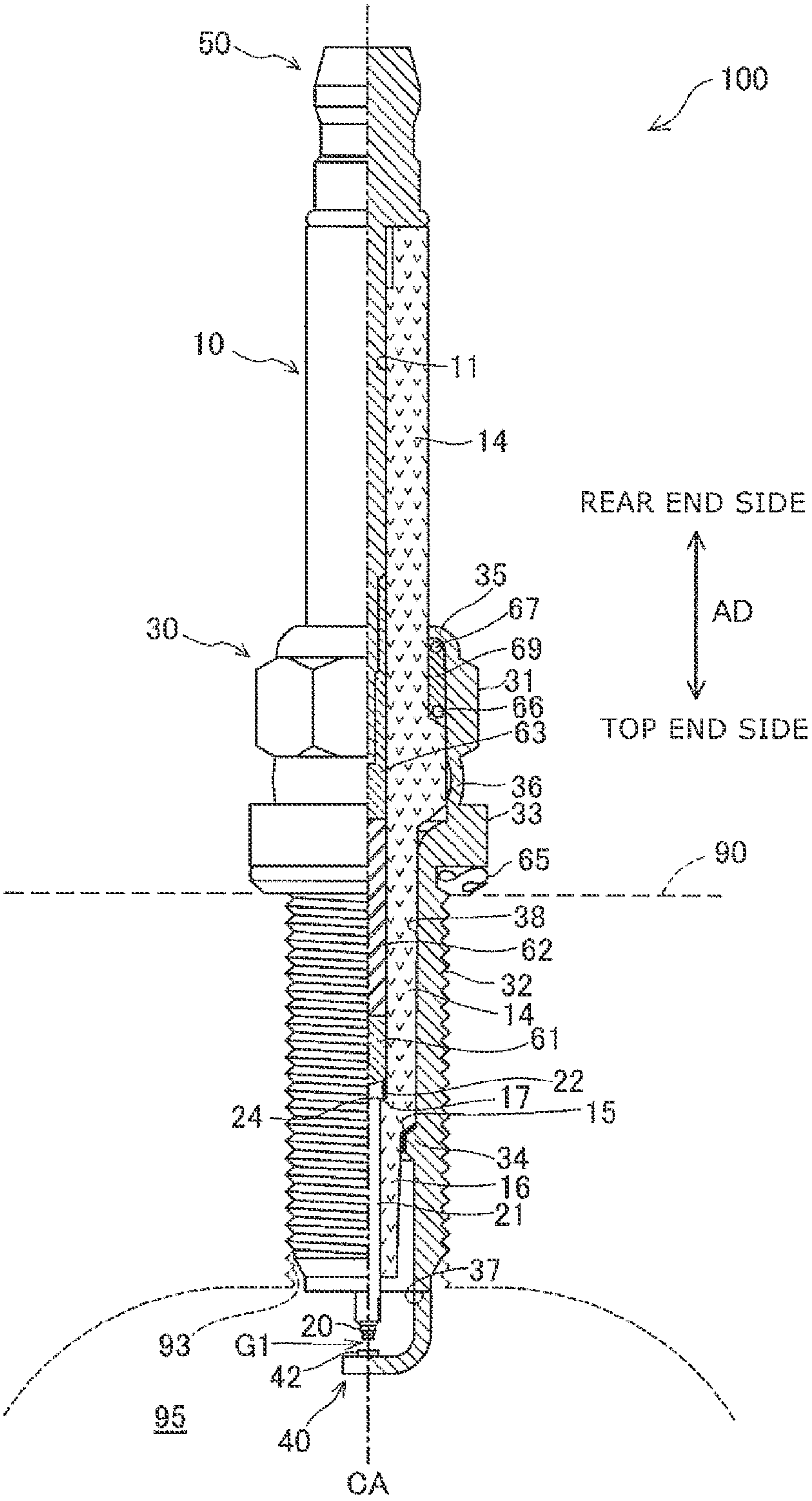
FIG. 1 is a partial sectional view showing a schematic configuration of a spark plug.

A. Embodiment:

FIG. 1 is a partial sectional view showing a schematic configuration of a spark plug 100 as an embodiment of the present disclosure. In FIG. 1, an outward appearance of the spark plug 100 is illustrated on a left side of the drawing with an axis CA as an axial center of the spark plug 100 being a boundary, and a cross-sectional shape of the spark plug 100 is illustrated on a right side of the drawing. In the following description, a lower side of FIG. 1 along the axis CA (a side on which an after-mentioned ground electrode 40 is provided) is called a top end side (or a tip end side), an upper side of FIG. 1 (a side on which an after-mentioned metal terminal 50 is provided) is called a rear end side, and a direction along the axis CA is called an axis direction AD. In FIG. 1, for convenience in description, an engine head 90 to which the spark plug 100 is connected is illustrated her a broken line.

The spark plug 100 has an insulator 10, a center electrode 20, a metal shell 30, the ground electrode 40 and the metal terminal 50. The axis CA of the spark plug 100 is aligned with each axis CA of members of the insulator 10, the center electrode 20, the metal shell 30 and the metal terminal 50.

The insulator 10 has a substantially tubular outward appearance having a penetration hole 11 formed along the axis direction AD. A part of the center electrode 20 is accommodated at a top end side in the penetration hole 11, whereas a part of the metal terminal 50 is accommodated at a rear end side in the penetration hole 11. Therefore, the insulator 10 supports the center electrode 20 in the penetration hole 11. Approximately half of a top end side of the insulator 10 is accommodated in an axial hole 38 of the after-mentioned metal shell 30, and approximately half of a rear end side of the insulator 10 is exposed from the axial hole 38. The insulator 10 is made of insulating glass formed by burning (or firing) ceramic material such as alumina.

The insulator 10 has a large diameter portion 14, a holding portion 15, a small diameter portion 16 and a step portion 17. The large diameter portion 14 is located at the rear end side of the insulator 10 in the axis direction AD. A diameter of the penetration hole 11 at the large diameter portion 14 is formed substantially constant. The holding portion 15 is formed at a top end side of the large diameter portion 14 so that its outside diameter is smaller toward the top end side along the axis direction AD. The small diameter portion 16 is located at the top end side in the axis direction AD with respect to the large diameter portion 14. A diameter of the penetration hole 11 at the small diameter portion 16 is smaller than the diameter of the penetration hole 11 at the large diameter portion 14. The penetration hole 11 at the small diameter portion 16 accommodates therein a part of a leg portion 21 of the after-mentioned center electrode 20.

Figure 2:
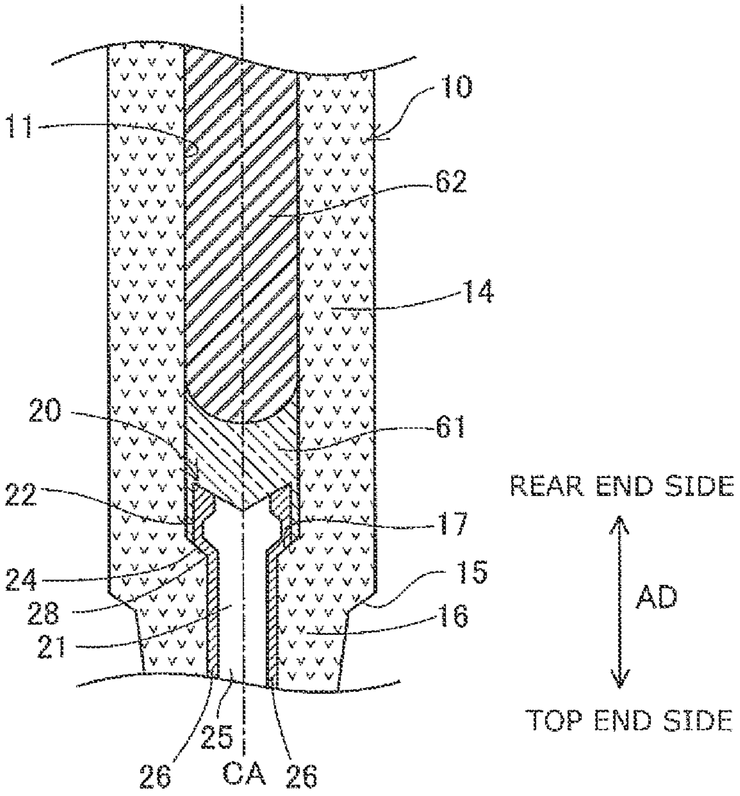
FIG. 2 is an enlarged sectional view schematically showing a step portion, a brim portion and their vicinities.

FIG. 2 is an enlarged sectional view schematically showing the step portion 17, a brim portion 22 and their vicinities. FIG. 2 shows a cross section including the axis CA. The step portion 17 is located between the large diameter portion 14 and the small diameter portion 16 in the axis direction AD, and connects the large diameter portion 14 and the small diameter portion 16. The step portion 17 of the present embodiment is formed so that the diameter of the penetration hole 11 is smaller toward the top end side along the axis direction AD. In other words, the step portion 17 is formed so as to protrude or bulge inwards in a radial direction in the penetration hole 11. The step portion 17 supports a connecting portion 24 of the center electrode 20.

The center electrode 20 shown in FIGS. 1 and 2 is a rod-shaped electrode extending in the axis direction AD. The center electrode 20 is supported in the penetration hole 11 of the insulator 10. The center electrode has the leg portion 21, the brim portion 22 and the connecting portion 24.

As illustrated in FIG. 1, the leg portion 21 is formed so as to extend in the axis direction AD, and a part of the leg portion 21 is exposed from the penetration hole 11. A noble metal chip made of e.g. an iridium alloy etc. could be joined to an end portion of a top end side of the leg portion 21.

As illustrated in FIG. 2, the brim portion 22 is located at the rear end. side with respect to the leg portion 21, and is formed so as to protrude outwards in the radial direction with respect to the leg portion 21. In other words, the brim portion 22 is formed at an end portion of a rear end side of the center electrode 20 so as to protrude or bulge outwards in the radial direction. In the present embodiment, an outside diameter of the brim portion 22 is formed substantially constant.

The connecting portion 24 connects the leg portion 21 and the brim portion 22. The connecting portion 24 abuts on the step portion 17 of the insulator 10. With this, positioning of the center electrode 20 in the penetration hole 11 of the insulator 10 is made. The connecting portion 24 of the present embodiment has a tapered shape whose outside diameter is gradually reduced toward the top end side.

The center electrode 20 of the present embodiment is formed with a core 25, which is excellent in thermal conductivity, being embedded inside an electrode member 26. In the present embodiment, the core 25 is made of an alloy containing copper as a main component. The electrode member 26 is made of a nickel alloy containing nickel as a main component.

As illustrated in FIG. 1, a part of the center electrode 20 is inserted into the penetration hole 11 of the insulator 10 at the top end side of the penetration hole 11, and a part of the metal terminal 50 is inserted into the penetration hole 11 of the insulator 10 at the rear end side of the penetration hole 11. In the penetration hole 11 of the insulator 10, a top end side seal member 61, a resistor 62 and a rear end side seal member 63 are disposed in an order from the top end side toward the rear end side between the center electrode 20 and the metal terminal 50. Therefore, the center electrode 20 is electrically connected to the metal terminal 50 at the rear end side of the center electrode 20 through the top end side seal member 61, the resistor 62 and the rear end side seal member 63.

The resistor 62 is made of ceramic powder, conducting material, glass and adhesive as materials. The resistor 62 functions as an electric resistance between the metal terminal 50 and the center electrode 20, thereby suppressing an occurrence of noise when spark discharge occurs. The top end side seal member 61 and the rear end side seal member 63 are each made of conductive glass powder as material. In the present embodiment, the top end side seal member 61 and the rear end side seal member 63 are each made of mixed powder of copper powder and calcium borosilicate glass powder as materials. The top end side seal member 61 contacts the brim portion 22, the insulator 10 and the resistor 62, and fixes these members to each other. The rear end side seal member 63 contacts the resistor 62, the insulator 10 and the metal terminal 50, and fixes these members.

As illustrated in FIG. 1, the metal shell 30 has a substantially tubular outward appearance having the axial hole 38 formed along the axis direction AD, and supports the insulator 10 in the axial hole 38. More specifically, the metal shell 30 supports the insulator 10 by surrounding a body part of the insulator 10 from a part of the large diameter portion 14 to the small diameter portion 16. The metal shell 30 is made of e.g. low-carbon steel, and is subjected to plating treatment such as nickel plating or zinc plating as a whole.

The metal shell 30 has a tool engagement portion 31, a male thread portion 32, a seat portion 33, a protruding portion 34, a caulking portion 35 and a compressive deformation portion 36.

The tool engagement portion 31 is engaged with a tool (not shown) when connecting the spark plug 100 to the engine head 90. The male thread portion 32 has threads on an outer peripheral surface of a top end portion of the metal shell 30, and is screwed into a female thread portion 93 of the engine head 90. The seat portion 33 is located so as to continue to a rear end side of the male thread portion 32, and is formed into a brim shape. A ring-shaped gasket 65 formed by folding a plate or a sheet is inserted and fitted between the seat portion 33 and the engine head 90. The protruding portion 34 is formed on an inner peripheral surface of the male thread portion 32 so as to protrude inwards in the radial direction. The holding portion 15 of the insulator 10 abuts on the protruding portion 34 from the rear end side. Therefore, the protruding portion 34 supports the insulator 10 inserted into the axial hole 38. A ring-shaped plate packing (or a ring-shaped sheet packing) (not shown) is provided between the protruding portion 34 and the holding portion 15.

The caulking portion 35 is formed so that a thickness at the rear end. side with respect to the tool engagement portion 31 is thinner. The compressive deformation portion 36 is formed so that a thickness between the tool engagement portion 31 and the seat portion 33 is thinner. Annular ring members 66 and 67 are interposed between the axial hole 38 of the metal shell and an outer peripheral surface of the large diameter portion 14 of the insulator 10 from the tool engagement portion 31 to the caulking portion 35 in the axis direction AD, and a space between these ring members 66 and 67 is filled with powder of talc 69. As described later, the metal shell 30 is fixed to the insulator 10 by caulking the caulking portion 35.

The ground electrode 40 is made of a bent bar-shaped metal member. Like the center electrode 20, the ground electrode 40 is made of a nickel alloy containing nickel as a main component. One end of the ground electrode 40 is fixed to a top end surface 37 of the metal shell 30, and the other end of the ground electrode 40 is bent or curved so as to face a top end portion (or a tip) of the center electrode 20. The ground electrode 40 is provided, at a portion thereof that faces the tip of the center electrode 20, with an electrode chip 42. A gap G1 for the spark discharge is formed between the electrode chip 42 and the tip of the center electrode 20. The gap G1 is also called a discharge gap or a spark gap.

The metal terminal 50 is provided at an end portion of a rear end side of the spark plug 100. A top end side of the metal terminal 50 is accommodated in the penetration hole 11 of the insulator 10, and a rear end side of the metal terminal 50 is exposed from the penetration hole 11. A high-tension cable (not shown) is connected to the metal terminal 50, and high voltage is applied to the metal terminal 50. The spark discharge occurs at the gap G1 by this high voltage application. The spark discharge occurring at the gap G1 ignites air-fuel mixture in a combustion chamber 95.

In the present embodiment, the top end side seal member 61 corresponds to a seal member in the present disclosure. The top end side (or the tip end side) corresponds to an axis direction top end side (or an axis direction tip end side) in the present disclosure, and the rear end side corresponds to an axis direction rear end side in the present disclosure.

A method of manufacturing the spark plug 100 will be described below.

First, the center electrode 20 is inserted into the penetration hole 11 of the insulator 10 from the rear end side. Subsequently, the penetration hole 11 is filled with the material powder of the top end side seal member 61 from the rear end side, and the material powder of the top end side seal member 61 is compressed from the rear end side (hereinafter, also referred to as "seal member filling process"). After that, the penetration hole 11 is filled with the material of the resistor 62 from the rear end side, and the material of the resistor 62 is compressed from the rear end side. Further, the penetration hole 11 is filled with the material powder of the rear end side seal member 63 from the rear end side, and the material powder of the rear end side seal member 63 is compressed from the rear end side. Each compression of the above could be performed, for instance, by inserting a rod-shaped jig (or a rod-shaped tool) into the penetration hole 11. Afterwards, an end portion of the top end side of the metal terminal 50 is inserted into the penetration hole 11, and compression is performed by applying a predetermined pressure from the metal terminal 50 side while heating the insulator 10 as a whole (hereinafter, also referred to as "heating compression process"). Each material filling the penetration hole 11 is compressed and burned by the heating compression process. With this, the top end side seal member 61, the resistor 62 and the rear end side seal member 63 are formed in the penetration hole 11. In this manner, the center electrode is fixed to the insulator 10.

Further, the insulator 10 to which the center electrode 20 has been fixed is inserted into the axial hole 38 of the metal shell 30 from the rear end side. Subsequently, by caulking the caulking portion 35 of the metal shell 30, the metal shell 30 and the insulator 10 are fixed together. At this time, by pressing the caulking portion 35 of the metal shell 30 to the top end side so as to fold the caulking portion 35 inwards in the radial direction, the compressive deformation portion 36 is compressed and deformed. By the compressive deformation of the compressive deformation portion 36, the insulator 10 is pressed toward the top end side in the metal shell 30 through the ring members 66 and 67 and the talc 69. In this manner, the spark plug 100 is completed.

As illustrated in FIG. 2, the center electrode 20 of the present embodiment does not have, at a rear end side thereof with respect to the brim portion 22, a portion whose diameter is reduced more than the brim portion 22. In the present embodiment, "does not have the portion whose diameter is reduced" means that when a maximum value of a radius of the brim portion 22 on the cross section including the axis CA is D1 and a minimum value of the radius of the brim portion 22 on the cross section including the axis CA is D2, in a case where the maximum value D1 of the radius of the brim portion 22 is 100%, a difference from the minimum value D2 of the radius of the brim portion 22 is within 6%. That is, the center electrode 20 of the present embodiment satisfies the following expression (1).

$$(D1-D2)/D1 \leq 0.06 \text{ expression} \quad (1)$$

Figure 3:
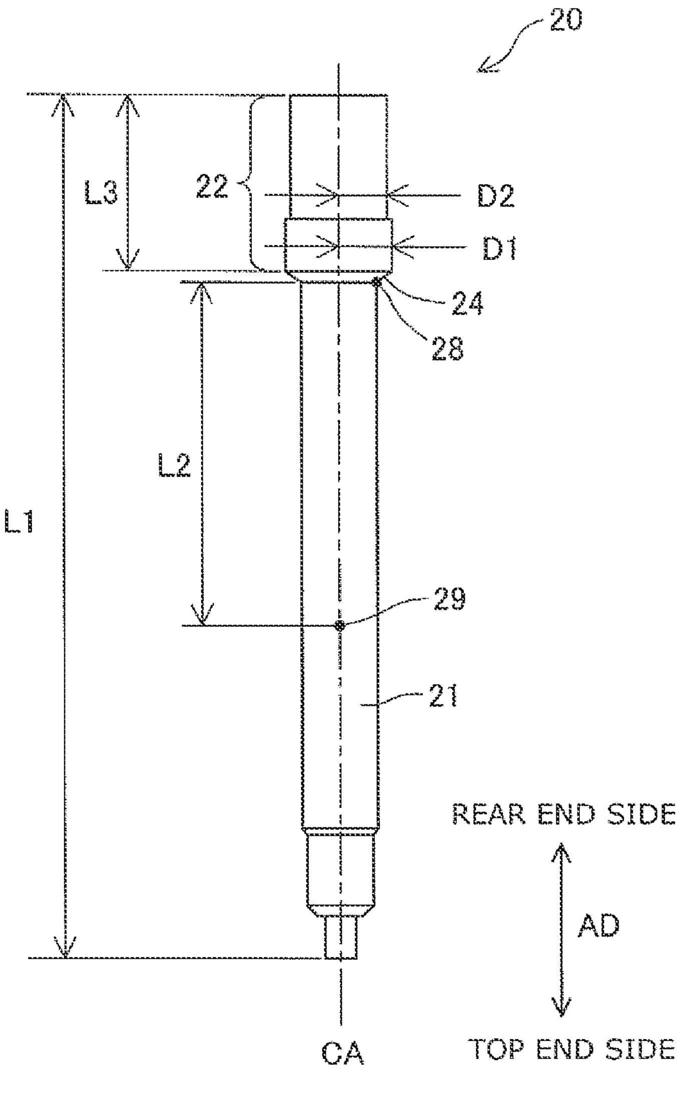
FIG. 3 is a schematic diagram for explaining a center of gravity of a center electrode.

FIG. 3 is a schematic diagram for explaining a center 29 of gravity of the center electrode 20. FIG. 3 schematically illustrates a structure of an outward appearance of the center electrode 20 viewed from a direction perpendicular to the axis CA. In FIG. 3, for convenience in description, the axis CA is shown by a dashed line, and the center 29 of gravity of the center electrode 20, located on the axis CA, is illustrated. In the present embodiment, the center 29 of gravity is positioned at a top end side in the axis direction AD with respect to the brim portion 22 and the connecting portion 24. Here, regarding the position of the center 29 of gravity, when a string is tied to the leg portion 21 of the center electrode 20 and the center electrode 20 is strung up or suspended from a vertically upper direction by this string, the position of the center 29 of gravity can be determined from a position of the string in the axis direction AD when the axis CA balances parallel with a horizontal direction.

When a size (a length) along the axis direction AD of the center electrode 20 on the cross section including the axis CA is L1 and a size (a length) along the axis direction AD from a boundary 28 between the connecting portion 24 and the leg portion 21 to the center 29 of gravity of the center electrode 20 is L2, the center electrode 20 of the present embodiment satisfies the following expression (2).

$$L2/L1 \leq 0.30 \text{ expression} \qquad (2)$$

In the present embodiment, the boundary 28 between the connecting portion 24 and the leg portion 21 means a boundary between a top end of the connecting portion 24 and a rear end of the leg portion 21. In a case of a structure in which the connecting portion 24 and the leg portion 21 are connected in a curved shape, the boundary 28 corresponds to a point (a virtual point) of intersection of a line obtained by extending the connecting portion 24 and a line obtained by extending the leg portion 21 on the cross section including the axis CA.

The length L1 in the above expression (2) corresponds to an overall length along the axis direction AD of the center electrode 20. Further, satisfaction of the expression (2) is equivalent to the fact that when the length L1 along the axis direction AD of the center electrode 20 is 100%, the length L2 along the axis direction AD from the boundary 28 to the center 29 of gravity is within 30%. The center electrode 20 of the present embodiment satisfies the above expression (2), thereby preventing the position of the center 29 of gravity with respect to a position of the connecting portion 24 from being excessively separated toward the top end side in the axis direction AD.

Here, as illustrated in FIG. 2, the center electrode 20 is supported with the connecting portion 24 abutting on the step portion 17 of the insulator and fixed to the insulator 10 by the top end side seal member 61 filling the penetration hole 11 and contacting the brim portion 22 and the insulator 10. Besides, as described above, the center electrode 20 of the present embodiment does not have, at the rear end side thereof with respect to the brim portion 22, the portion whose diameter is reduced more than the brim portion 22. That is, the above expression (1) is satisfied. Because of this, as compared with a structure having, at the rear end side thereof with respect to the brim portion 22, the portion whose diameter is reduced more than the brim portion 22, i.e. a spark plug not satisfying the above expression (1), a surface area, which contacts the top end side seal member 61, of the brim portion 22 becomes small. Therefore, in a case of a structure in which the center 29 of gravity of the center electrode 20 is excessively separated from forming positions of the connecting portion 24 and the brim portion 22 toward the top end side, when the spark plug 100 is used with the spark plug 100 connected to the engine head 90 as illustrated in FIG. 1, since a distance from the center 29 of gravity to the brim portion 22 is long, the brim portion 22 greatly swings or vibrates due to vibrations of the engine etc.. As a consequence, there is a risk that the top end side seal member 61 will be deformed then looseness of the center electrode 20 will occur. However, according to the spark plug 100 of the present embodiment, since the above expression (2) is satisfied, it is possible to prevent the position of the center 29 of gravity of the center electrode 20 from being located at an excessively top end side. This suppresses the excessive swing or vibration of the brim portion 22 caused by the vibrations of the engine etc.. As a result, the occurrence of the looseness of the center electrode 20 can be suppressed.

A value of L2/L1 is preferably 0.30 or less, more preferably 0.27 or less, and still more preferably 0.25 or less, in terms of suppressing the occurrence of the looseness of the center electrode 20. When the value of L2/L1 is 0.25 or less, since the position of the center 29 of gravity of the center electrode 20 can be brought closer to the positions of the connecting portion 24 and the top end side seal member 61, the occurrence of the looseness of the center electrode 20 can be further suppressed. Further, by a method(s) of (i) as material constituting the brim portion 22, a substance having a higher specific gravity than that of material constituting the leg portion 21 is used, (ii) the size (the length) of the brim portion 22 is set to be large in the axis direction AD and/or (iii) the size of the brim portion 22 is set to be large in the radial direction, the center 29 of gravity is positioned at a further rear end side, then the value of L2/L1 can be smaller. However, if the brim portion 22 is formed as a separate member, the number of manufacturing processes is increased. Also, if the size of the brim portion 22 is set to be large, as a drawback, an electric capacity is increased. Therefore, in terms of reducing the number of manufacturing processes and suppressing the increase in the electric capacity, the value of L2/L1 is preferably 0 or more, more preferably or more, and still more preferably 0.2 or more. In terms of suppressing the occurrence of the looseness of the center electrode 20 and suppressing the increase in the electric capacity, the value of L2/L1 could be, for instance, 0.2 or more and 0.27 or less. Here, in the present application, in a case where the center 29 of gravity is positioned at a rear end side along the axis direction AD with respect to the boundary 28 between the connecting portion 24 and the leg portion 21, a value of L2 becomes a negative value.

As illustrated in FIG. 3, the size (the length) L1 of the center electrode 20 of the present embodiment may be, for instance, about 10 mm to 30 mm. Further, a size (a length) L3 along the axis direction AD of the brim portion 22 of the center electrode 20 of the present embodiment may be, for instance, about 1.5 mm to 3.0 mm. When the length L3 is formed to be relatively small, since the increase in the electric capacity can be suppressed, it is possible to suppress exhaustion of the center electrode 20.

A method of setting the value of L2/L1 to 0.30 or less is not particularly limited, but the following method can be raised as examples. For instance, at least a part of the brim portion 22 is formed of material having a higher specific gravity than that of material constituting the center electrode 20. According to this method, since a change in outer dimensions of the center electrode 20 does not occur, it is possible to suppress an occurrence of a design change of the other constituent members of the spark plug 100 other than the center electrode 20. As other methods, for instance, sizes (lengths) along the axis direction AD of the brim portion 22 and/or the connecting portion 24 are set to large, or sizes along the radial direction of the brim portion 22 and/or the connecting portion 24 are set to large.

According to the spark plug 100 of the present embodiment described above, since the above expression (2) is satisfied, in the center electrode 20 satisfying the above expression (1), it is possible to prevent the position of the center 29 of gravity of the center electrode 20 from being located at an excessively top end side. Therefore, since the position of the center 29 of gravity of the center electrode 20 can be prevented from being excessively separated from the position of the top end side seal member 61 fixing the center electrode 20 and the insulator 10, it is possible to suppress the occurrence of the looseness of the center electrode 20 caused by the vibrations of the engine etc.. Accordingly, in the spark plug 100 having the center electrode 20 satisfying the above expression (1) and not having, at the rear end side thereof with respect to the brim portion 22, the portion whose diameter is reduced more than the brim portion 22, it is possible to suppress an occurrence of a crack around the boundary 28 between the connecting portion 24 and the leg portion 21 of the center electrode 20. Hence, degradation in performance of the spark plug 100 having the center electrode 20 not having, at the rear end side thereof with respect to the brim portion 22, the portion whose diameter is reduced more than the brim portion 22 can be suppressed.

Further, since the above expression (1) is satisfied, i.e. the center electrode 20 does not have, at the rear end side thereof with respect to the brim portion 22, the portion whose diameter is reduced more than the brim portion 22, the length L3 along the axis direction AD of the brim portion 22 can be small. This can suppress the increase in the electric capacity, thereby suppressing the exhaustion of the center electrode 20. Therefore, according to the spark plug 100 of the present embodiment, since the above expression (1) is satisfied and the above expression (2) is satisfied, it is possible to suppress the occurrence of the looseness of the center electrode 20 while suppressing the increase in the electric capacity.

B. Example

The present invention will be further described below by examples. However, the present invention is not limited to the following examples.

<Sample>

As an example 1, the spark plug 100 having the center electrode 20 satisfying the above expression (1) and the above expression (2) was produced. The value of L2/L1 in the above expression (2) of the spark plug 100 of the example 1 was 0.250. As an example 2, the spark plug 100 having the center electrode 20 satisfying the above expression (1) and the above expression (2) was produced. The value of L2/L1 in the above expression (2) of the spark plug 100 of the example 2 was 0.274.

As a comparative example 1, a spark plug having a center electrode satisfying the above expression (1) but not satisfying the above expression (2) was produced. The value of L2/L1 in the above expression (2) of the spark plug of the comparative example 1 was 0.351. In addition, as comparative examples 2 and 3, spark plugs each having a center electrode not satisfying the above expression (1) were produced.

Figure 4:
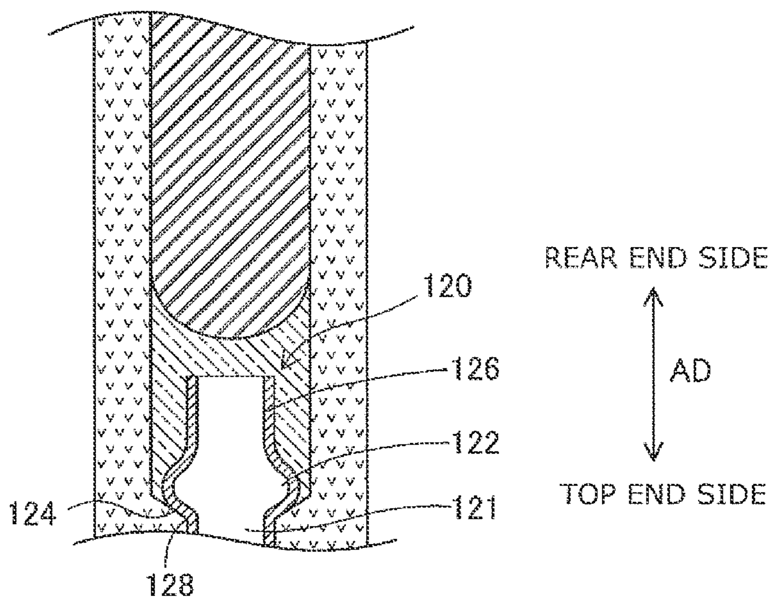
FIG. 4 is a sectional view schematically showing a configuration of a center electrode of a comparative example 2.

FIG. 4 is a sectional view schematically showing a configuration of a center electrode 120 of the comparative example 2. FIG. 4 illustrates a cross section like FIG. 2 with a brim portion 122 and its vicinity being enlarged. The center electrode 120 provided in the spark plug of the comparative example 2 has, at a rear end side thereof with respect to the brim portion 122, a diameter-reducing portion 126 whose diameter is reduced more than the brim portion 122. Because of such a configuration (or a structure), the center electrode 120 of the comparative example 2 does not satisfy the above expression (1). Further, as compared with a size (a length) of a rear end side with respect to the boundary 28 between the connecting portion 24 and the leg portion 21 of the center electrode 20 of the examples 1 and 2 as shown in FIG. 2, a size (a length) of a rear end side with respect to a boundary 128 between a connecting portion 124 and a leg portion 121 of the center electrode 120 of the comparative example 2 is large. The center electrode of the comparative example 3 has the same structure of an outward appearance as that of the center electrode 120 of the comparative example 2.

<Impact resistance test>

Impact resistance test was performed on the spark plugs 100 of the examples 1 and 2 and the spark plugs of the comparative examples 1 to 3. The impact resistance test was carried out using four samples for each of the examples and the comparative examples. The impact resistance test was performed in conformity with a method described in "JIS B 8031: 7.4 impact resistance test", and impact of vibration amplitude of a stroke 22 (+1/0) mm was applied at a rate of 400 (+20/0) times per minute for 10 (+1/0) minutes. A degree of looseness of each of the center electrodes 20 and 120 of the samples after the test was evaluated. Further, impact resistance test was carried out by the same manner except that the test time was changed to 20 to 60 minutes, and a degree of looseness of each of the center electrodes 20 and 120 of the samples after the test was evaluated. Evaluation criteria is shown below.

A: extremely good (no occurrence of the looseness)
B: good (few occurrences of the looseness)
C: not good (many occurrences of the looseness)

A result of the impact resistance test and an evaluation result are shown in the following table.

TABLE 1

| | | test time (the number of looseness/the number of samples) | | | | | | | |
|---|---|---|---|---|---|---|---|---|---|
| | (D1-D2)/D1 | 10 min. | 20 min. | 30 min. | 40 min. | 50 min. | 60 min. | L2/L1 | evaluation |
| example 1 | ≤0.06 | 0/4 | 0/4 | 0/4 | 0/4 | 0/4 | 0/4 | 0.250 | A |
| example 2 | ≤0.06 | 0/4 | 0/4 | 0/4 | 1/4 | 1/4 | 1/4 | 0.274 | B |
| comparative example 1 | ≤0.06 | 4/4 | — | — | — | — | — | 0.351 | C |
| comparative example 2 | >0.06 | 0/4 | 0/4 | 0/4 | 0/4 | 0/4 | 0/4 | 0.261 | A |
| comparative example 3 | >0.06 | 0/4 | 0/4 | 0/4 | 0/4 | 0/4 | 0/4 | 0.190 | A |

From Table 1, the following can be seen. That is, in the cases of the spark plugs 100 of the examples 1 and 2 satisfying the above expression (1) and the above expression (2), the occurrences of the looseness of the center electrode 20 after the impact resistance test are few, then good results were obtained, as compared with the spark plug of the comparative example satisfying the above expression (1) but not satisfying the above expression (2).

More specifically, in the case of the spark plug 100 of the example 1, no looseness of the center electrode 20 was observed in the impact resistance test for 60 minutes, and thus its evaluation result was A. Also, in the case of the spark plug 100 of the example 2, no looseness of the center electrode 20 was observed in the impact resistance test for 30 minutes, and only one looseness of the center electrode 20 was observed in the impact resistance test for 60 minutes, and thus its evaluation result was B. From comparison between the examples 1 and 2, it can be seen that as the value of L2/L1 is smaller, the occurrence of the looseness of the center electrode 20 can be suppressed more.

In contrast to this, in the case of the spark plug of the comparative example 1, the looseness of the center electrode occurred in all samples in the impact resistance test for 10 minutes, and thus its evaluation result was C. Regarding the spark plugs of the comparative examples 2 and 3 not satisfying the above expression (1), although their evaluation results were each A, as illustrated in FIG. 4, since a size (a length) of the brim portion 122 is large as compared with the size (the length) L3 of the brim portions 22 of the examples 1 and 2, the increase in the electric capacity cannot be suppressed.

C. Other embodiment

The present invention is not limited to the above embodiment, and can be realized with various configurations without departing from the scope of the present invention. For instance, technical features in the embodiment corresponding to technical features in each embodiment described in the summary of the invention can be replaced or combined as necessary in order to solve some or all of the problems described above or in order to achieve some or all of the effects described above. Further, if the technical features are not described as an essential in the present specification, it is possible to appropriately delete the technical features.

The configuration or structure of the spark plug 100 of the above embodiment is merely an example, and can be variously modified, For instance, the connecting portion 24 has the tapered shape whose outside diameter is gradually reduced toward the top end side, but may be formed along a direction substantially perpendicular to the axis direction AD. Further, the step portion 17 is formed so that the diameter of the penetration hole 11 is smaller toward the top end side along the axis direction AD, but may be formed along a direction substantially perpendicular to the axis direction AD. Even with these configurations, the same effects as those of the above embodiment can be obtained.

EXPLANATION OF REFERENCE

10 insulator
11 penetration hole
14 large diameter portion
15 holding portion
16 small diameter portion
17 step portion
20 center electrode
21 leg portion
22 brim portion
24 connecting portion
25 core
26 electrode member
28 boundary
29 center of gravity
30 metal shell
31 tool engagement portion
32 male thread portion
33 seat portion
34 protruding portion
35 caulking portion
36 compressive deformation portion
37 top end surface
38 axial hole
40 ground electrode
42 electrode chip
50 metal terminal
61 top end side seal member (seal member)
62 resistor
63 rear end side seal member
65 gasket
66, 67 ring members
69 talc
90 engine head
93 female thread portion
95 combustion chamber
100 spark plug
120 center electrode
121 leg portion
122 brim portion
124 connecting portion
126 diameter-reducing portion
128 boundary
AD axis direction
CA axis
G1 gap

The invention claimed is:

1. A spark plug comprising:

a center electrode having a leg portion extending in an axis direction along an axis of the spark plug, a brim portion located at an axis direction rear end side with respect to the leg portion and formed so as to protrude outwards in a radial direction with respect to the leg portion and a connecting portion connecting the leg portion and the brim portion;

an insulator having a penetration hole formed along the axis direction and supporting the center electrode in the penetration hole; and a seal member filling the penetration hole and fixing the brim portion and the insulator, and wherein the insulator has a large diameter portion located at an axis direction rear end side of the insulator;

a small diameter portion located at an axis direction top end side with respect to the large diameter portion, a diameter of the penetration hole at the small diameter portion being smaller than a diameter of the penetration hole at the large diameter portion; and a step portion connecting the penetration hole at the large diameter portion and the penetration hole at the small diameter portion and supporting the connecting portion, and the center electrode satisfies "(D1-D2.)/D1≤0.06", where a maximum value of a radius of the brim portion on a cross section including the axis is D1, and a minimum value of the radius of the brim portion on the cross section is D2, and the center electrode also satisfies "L2/L1≤0.30", where a size of the center electrode along the axis direction on the cross section is L1, and a size along the axis direction from a boundary between the connecting portion and the leg portion to a center of gravity of the center electrode is L2.

2. The spark plug as claimed in claim 1, wherein the sizes L1 and L2 of the center electrode satisfy "L2/L1≤0.25".

* * * * *